United States Patent [19]

Bruce

[11] Patent Number: 4,815,856
[45] Date of Patent: Mar. 28, 1989

[54] METHOD AND APPARATUS FOR MEASURING THE ABSOLUTE THICKNESS OF DUST DEFOCUS LAYERS

[75] Inventor: Robert A. Bruce, Morrison, Colo.

[73] Assignee: Storage Technology Partners II, Louisville, Colo.

[21] Appl. No.: 870,844

[22] Filed: Jun. 5, 1986

[51] Int. Cl.[4] .............................................. G01B 9/02
[52] U.S. Cl. ...................................... 356/357; 364/525
[58] Field of Search ....................... 356/357, 381, 382; 364/525

[56] References Cited

U.S. PATENT DOCUMENTS

| | | | |
|---|---|---|---|
| 3,612,692 | 10/1971 | Kruppa et al. | 356/108 |
| 3,664,739 | 5/1972 | Pryor | 356/32 |
| 3,720,471 | 3/1973 | Kasahara et al. | 356/108 |
| 3,744,912 | 7/1973 | Williams et al. | 356/108 |
| 3,788,746 | 1/1974 | Baldwin et al. | 356/106 |
| 3,816,649 | 6/1974 | Butters et al. | 178/6.8 |
| 3,869,211 | 3/1975 | Watanabe et al. | 356/357 |
| 3,930,730 | 1/1976 | Laurens et al. | 356/106 R |
| 3,943,278 | 3/1976 | Ramsey, Jr. | 178/6.8 |
| 3,957,376 | 5/1976 | Charsky et al. | 356/356 |
| 3,994,599 | 11/1976 | Southwell | 356/108 |
| 4,180,830 | 12/1979 | Roach | 358/128 |
| 4,221,486 | 9/1980 | Jaerisch et al. | 356/357 |
| 4,293,224 | 10/1981 | Gaston et al. | 356/357 |
| 4,329,058 | 5/1982 | James et al. | 356/352 |
| 4,330,213 | 5/1982 | Kleinknecht et al. | 356/355 |
| 4,377,343 | 3/1983 | Monson | 356/357 |
| 4,443,106 | 4/1984 | Yasuda et al. | 356/357 |
| 4,453,828 | 6/1984 | Hershel et al. | 356/357 |
| 4,618,261 | 10/1986 | Flanders et al. | 356/357 |

OTHER PUBLICATIONS

Tabouda et al., "Rectangular Grid Fringe Pattern for Topographic Applications", *Applied Optics*, 3/1976, pp. 597-599.
Robert A. Bruce et al. "Scanning Absolute Thickness of the Protective Overcoat Layer on Spinning Optical Disks", *Digest of Technical Papers*, pp. 56-57, Conference on Lasers and Electro Optics (OSA/IEEE) San Francisco, CA, Jun. 9-13, 1986.

*Primary Examiner*—Davis L. Willis
*Assistant Examiner*—Matthew W. Koren
*Attorney, Agent, or Firm*—Woodcock Washburn Kurtz Mackiewicz & Norris

[57] ABSTRACT

A method and apparatus for measuring the absolute thickness of dust defocus layers upon spinning optical disks utilizes a collimated, expanded beam of light from a helium-neon laser which is focused into a converging beam and directed towards the layer at a predetermined angle of incidence defined by an angular spread centered about the angle of incidence. A pair of divergent beams reflecting from the upper and lower surfaces of the layer are received by a collecting mirror and are recollimated by a collimating lens to be incident upon a self-scanning photodiode array. The divergent beams form a monotonic interference pattern having a fringe density which is proportional to the distance between the upper and lower surfaces, and which is determined by the photodiode array.

7 Claims, 4 Drawing Sheets

METHOD AND APPARATUS FOR MEASURING THE ABSOLUTE THICKNESS OF DUST DEFOCUS LAYERS

BACKGROUND OF THE INVENTION

This invention relates generally to a method and apparatus for measuring the distance between upper and lower surfaces of a transparent coating upon a planar surface, and more particularly to a scanning angular fringe spectrometer for measuring the absolute thickness of a dust defocus layer upon a spinning optical disk.

The recording layer of optical disks are frequently protected from scratches and dust particles by a transparent overcoat layer, sometimes known as a dust defocus layer, for keeping such effects out of focus. Since typical servo control objective lenses which are used to read optical disks generally require negative spherical aberration to counter the effect of focusing through air followed by a refractive layer, the thickness range of the dust defocus layer within which the lens can properly focus is severely limited. It has, therefore, been desirable in the past to monitor the thickness of such dust defocus layers for quality control in the production of optical disks.

Various thickness monitoring approaches have been considered in the past. For example, Southwell discloses in U.S. Pat. No. 3,994,599 a method of measuring the wall thickness of a tubular glass article by comparing the spacing between an interference fringe pattern formed upon a screen with a predetermined standard, a reject signal being created when the fringe spacing deviates from the predetermined standard by a predetermined amount. Such a method, however, is dependent upon the establishment of a standard for comparison, as well as the requirement for a tubular glass article in order to cause the angular fringes. As a result, the method and apparatus disclosed by Southwell is inappropriate for determining the absolute thickness of a dust defocus layer upon a planar optical disk.

A related approach, disclosed by Gaston et al in U.S. Pat. No. 4,293,224, utilizes the cyclic patterns of intensity change to wavelengths which are compared to identify the absolute thickness of a transparent film during microelectronic fabrication processes. A reflected white light, modified by optical interference in the transparent dielectric film, is monitored by photodetectors at two distinct wavelengths selected so that some particular coincidence of extrema in the two signals occurs at a film thickness less than the expected minimum initial thickness, and does not occur at any greater thickness up to and including the expected maximum. While the apparatus disclosed by Gaston et al is suitably inexpensive, the range of thicknesses which may be monitored is apparently limited to path length differences of less than 20 micrometers. Furthermore, there are restrictive choices in both the selection of wavelengths employed, and the positioning of the fringe patterns. Similar approaches use a spectrophotometer which scans wavelengths for a point on the coating. By monitoring the shift in fringe order number, $\Delta m$, thickness of the coating can be determined from the equation $$t = \left( \Delta m \left[ 2n \frac{1}{\lambda_2} - \frac{1}{\lambda_1} \right) \right] )$$

for normal incidence where n is the index of refraction and $\lambda_i$ are the end-point wavelengths. One drawback to such methods, however, is the requirement for temporal fringe counting. It is, therefore, desirable to employ a method for measuring the absolute thickness of a dust defocus layer upon an optical disk wherein the method is not time dependent.

A further drawback to each of the above described apparatuses is their relative complexity of operation. In manufacturing processes such as the fabrication of optical disks, it is desirable to minimize both the complexity of design and cost of construction. Accordingly, simple apparatuses such as that disclosed by Hershel et al in U.S. Pat. No. 4,453,828 are preferably used to accurately measure the thicknesses of thin, optical membranes. By directing a light beam onto a representative thin, optical membrane, and varying the angle of incidence of the light beam upon the membrane, Hershel et al detects the angles of incidence of the light beam on the membrane, including the null angles where the membrane reflects substantially none of the incident light, and calculates the optical thickness of the membrane from one or more such null angles. While the method and apparatus for measuring the thickness of thin, optical membranes disclosed by Hershel et al may be appropriate for membranes having a nominal thickness in the range of about 0.5 to 10 micrometers, its application of measuring one or more fringes by sensed nulls is inappropriate for accuracy considerations because the sinusoidal-like fringes are better specified at the steep slope regions, or midway between the nulls and the peaks. As is well known, such nulls and peaks are actually zones of low sensitivity "peaks." Moreover, such a method is incapable of dynamically scanning the membrane to determine its thickness, and is therefore inappropriate for use in monitoring the absolute thickness of the dust focus layer upon a spinning optical disk having a nominal thickness of approximately 200 micrometers.

SUMMARY OF THE INVENTION

Accordingly, it is a general purpose and object of the present invention to provide a method and apparatus for measuring the distance between upper and lower surfaces of a transparent coating upon a planar surface.

More specifically, it is an object of the present invention to provide a method and apparatus for measuring the absolute thickness of a dust defocus layer upon a optical disk.

Another object of the present invention is to provide a method and apparatus for measuring the absolute thickness of a dust defocus layer upon an optical disk which is essentially not time dependent, and which is simple to implement.

A further object of the present invention is to provide a method and apparatus which is capable of dynamically scanning the dust defocus layer, thereby determining its thickness upon a spinning optical disk.

Yet another object of the present invention is to provide a method and apparatus for measuring the absolute thickness of a dust defocus layer upon a spinning optical disk which includes simple optics, and is capable of both high speed and high accuracy.

Briefly, these and other objects of the present invention are accomplished by an apparatus for measuring the distance between upper and lower surfaces of a transparent coating upon a planar surface, the apparatus including means for producing a beam of light, means, optically coupled to the light-producing means, for collimating the beam and elongating the beam shape, lens means coupled to receive the collimated beam for focusing it at a point proximate to the coating, thereby forming a converging beam which is directed towards the coating at a predetermined angle of incidence defined by an angular spread centered about the angle of incidence, wherein the converging beam is reflected from the upper and lower surfaces, thereby forming a pair of diverging beams with an interference pattern having a fringe density which is proportional to the distance between the upper and lower surfaces. A sensing means is conveniently coupled to receive the interference pattern for counting the number of fringes over the spatial extent of such sensing means, and thus providing sufficient data to determine the distance between the upper and lower surfaces of the transparent coating.

In accordance with a preferred embodiment of the invention, the light-producing means may comprise a laser which is coupled through a cylindrical telescope to produce the collimated beam. A focus lens thereafter receives a collimated beam with an elongated shape for optimal coupling of the light to a line scanning array forming the converging beam which is directed by a projecting mirror towards the coating. The reflected beams from the two coating surfaces interfere forming a fringe pattern, the density of which is proportional to the absolute thickness of the coating or dust defocus layer. This pattern is then received by a collecting mirror and directed towards the sensing means by a collimating lens.

In accordance with one important aspect of the invention, the sensing means may comprise a self-scanning photodiode array arranged in the form of a line scanner and including a plurality of photodiodes, each of the photodiodes having an associated capacitance and a multiplex switch. The line scanner further includes a digital shift register driven at a clock rate selected to sample the photodiodes at a predetermined rate, such that the shift register sequentially activates the multiplex switches and empties to a common output line a charge from each of the diode capacitances indicative of the light which is incident thereon. Since the fringe density is approximately constant in the range about the predetermined angle of incidence, in accordance with yet another important aspect of the invention, the method for determining the absolute thickness of the dust defocus layer assumes the fringes to be uniformly spaced, and counts both clock pulse and zero crossings, that is the midpoint between the brightest and darkest regions of the interference pattern, from the first to the last zero crossing. The zero crossing count minus one is then multiplied by the number of photodiodes and divided by the clock count encompassing the zero crossing to yield a normalized fringe count which can be accurately used in a dynamic environment to scan the absolute thickness profile of the dust defocus layer.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
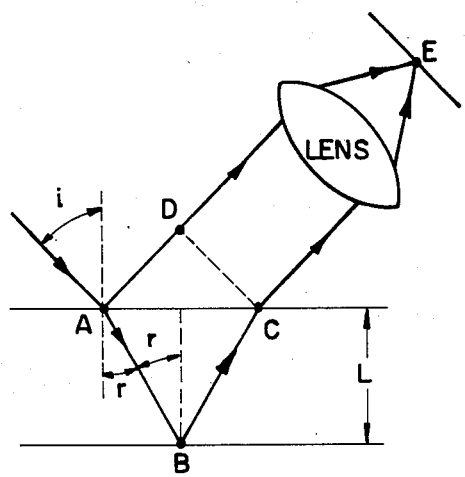
FIG. 1 is a schematic diagram illustrating interference effects in a thin film exposed to a single beam of light.

Referring now to the drawings, wherein like characters designate like or corresponding parts throughout the several views, there is shown in FIG. 1 a schematic diagram which illustrates the interference effects in a thin film exposed to a single beam of light. Such interference effects, involving division of amplitude and recombination of sheared wave fronts, occur between the light reflected at A on the front surface of the plate and at B on the rear surface. If the plate has parallel faces then the two sets of waves from A and C are parallel and a lens must be used to bring them together to interfere. Using elementary geometry and Snell's Law, it is apparent that the optical path difference $(\overline{AB}+\overline{BC})$ n-$\overline{AD}$ is equal to 2nL cos r, where n is the index of refraction of the plate, r is the angle of refraction, and L is the plate thickness. The phase difference, as is well known, is then:

$(2\pi/\lambda)(2nL \cos r)$ therefore bright fringes occur when:

$$\frac{4\pi nL\cos r}{\lambda} = 2m\pi$$

that is:

$m\lambda = 2nL\cos r$

Likewise dark fringes occur when:

$(2m+1) \lambda/2 = 2nL\cos r$

Figure 2:
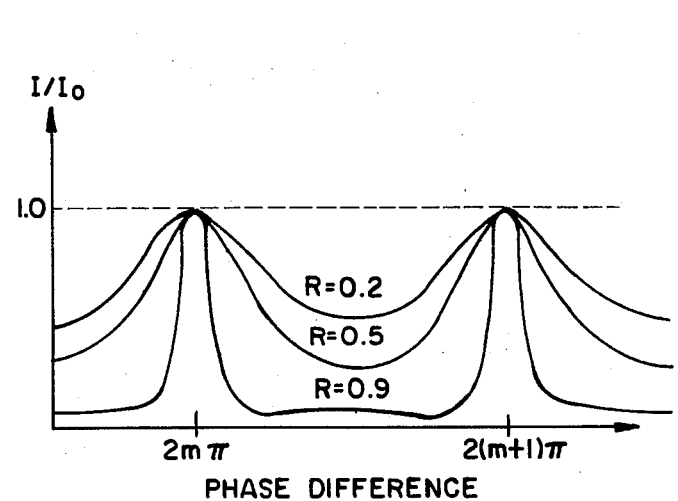
FIG. 2 is a schematic diagram showing the variation in the irradiance distribution of multiple beam interference fringes as a function of reflectance R.

If the plate is optically denser than the surrounding medium there is a phase change of $\pi$ (which is identical to a $\lambda/2$ shift) on reflection at the lower surface, thereby causing the above conditions to be interchanged. The resultant interference fringe pattern is illustrated in FIG. 2 as a function of reflectance.

The same case holds true for a single beam of light having two parallel rays which are incident on the top surface of the coating and spaced upon such that the ray that reflects off the bottom surface coincides with that reflecting off the top. From a derivation of Snell's Law, it can also be shown in conjunction with FIG. 1 that the distance between the upper and lower surfaces, t, is defined by the equation:

$$t = \frac{m\lambda}{2n\cos\left[\sin^{-1}\left(\frac{\sin\theta i}{n}\right)\right]} \quad (1)$$

Such a derivation, however, for a given angle of incidence, $\theta_i$, is not sufficient because the value of m (not necessarily an integer) is not known.

Figure 3:
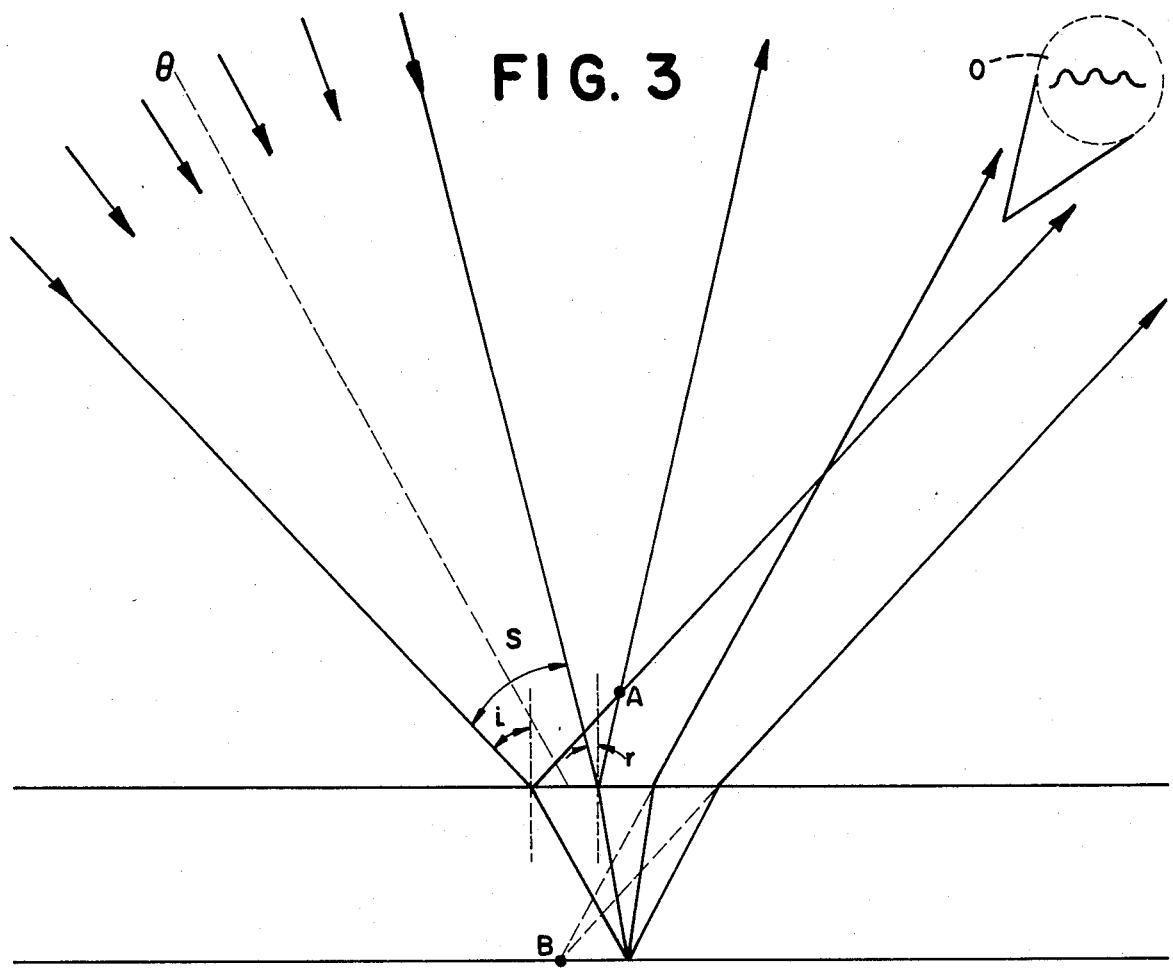
FIG. 3 is a schematic diagram illustrating the region of interference caused by angled, divergent beams reflected from a coating surface in accordance with the present invention.

On the other hand, consider the case of a continuum of angled rays as shown in FIG. 3 converging to the bottom surface. Reflection of the incident converging beam leads to two apparent point sources A and B, one reflecting from the bottom surface and the other some distance from the top. These beams then diverge and overlap as they propagate away from the coating. In this overlap region O, a monotonic interference fringe pattern similar to one of the curves shown in FIG. 2 results, thus indicating path length variations due to the incidence spread of angles. What is observed here is a shift in fringe order that corresponds to the angular spread S between the outer angular limits of the converging beam. This shift can be measured as a fringe count that subtends the two angular limits which in turn relates to the distance between the upper and lower surfaces. Rewriting equation 1 for the angular limits $i_1$ and $i_2$ yields two equations with m and i as variables. Subtracting one from the other gives an expression involving the shift in order, $$\Delta m = m_2 - m_1$$

Therefore:

$$t = \frac{\Delta m \lambda}{2} \left[\sqrt{n^2 - \sin^2(i_2)} - \sqrt{n^2 - \sin^2(i_1)}\right]^{-1} \quad (2)$$

Figure 5A:
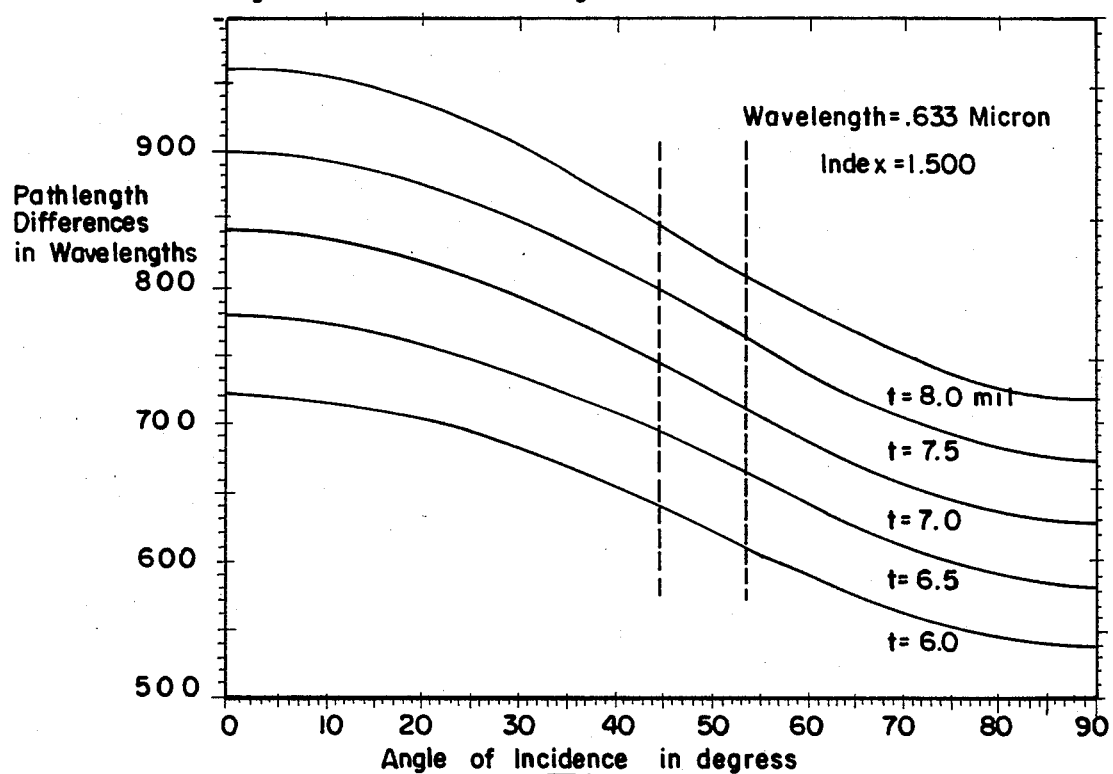
FIG. 5a and 5b respectively show a plot of the interference fringe order and as a function of the angle of incidence, and a plot of angular fringe density as a function of the angle of incidence for various coating thicknesses.
Figure 5B:
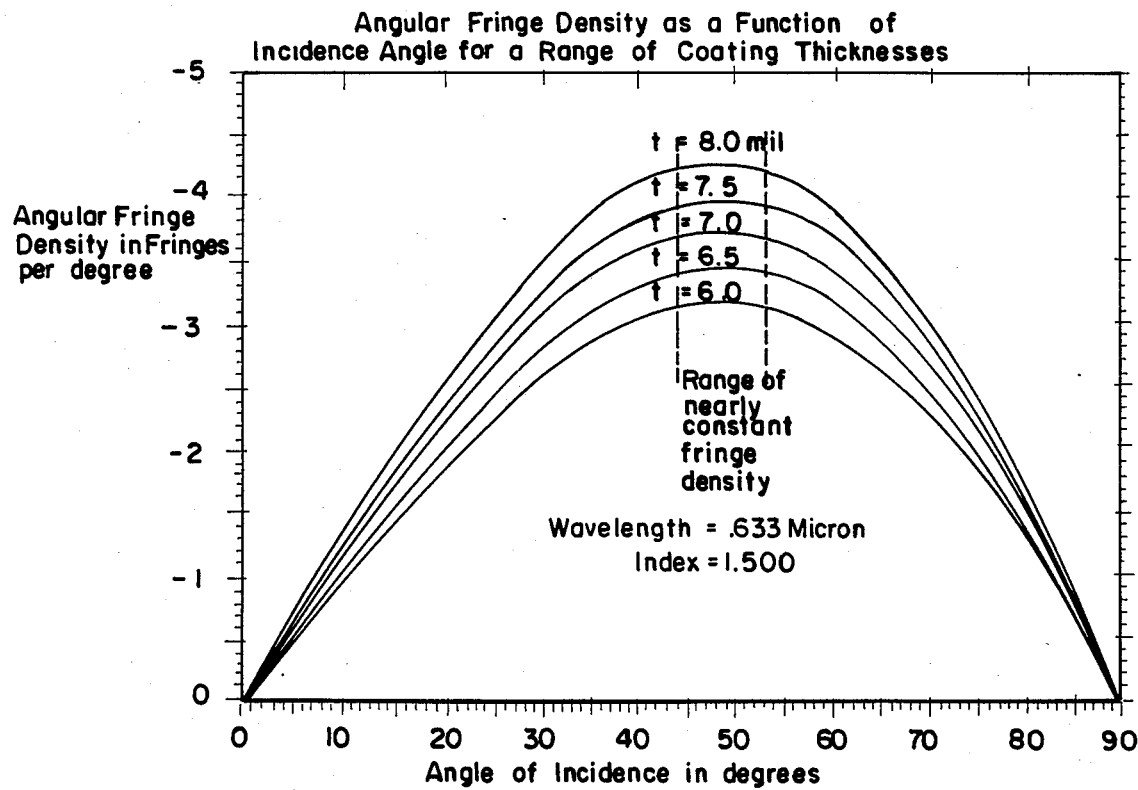
Figure 6A:
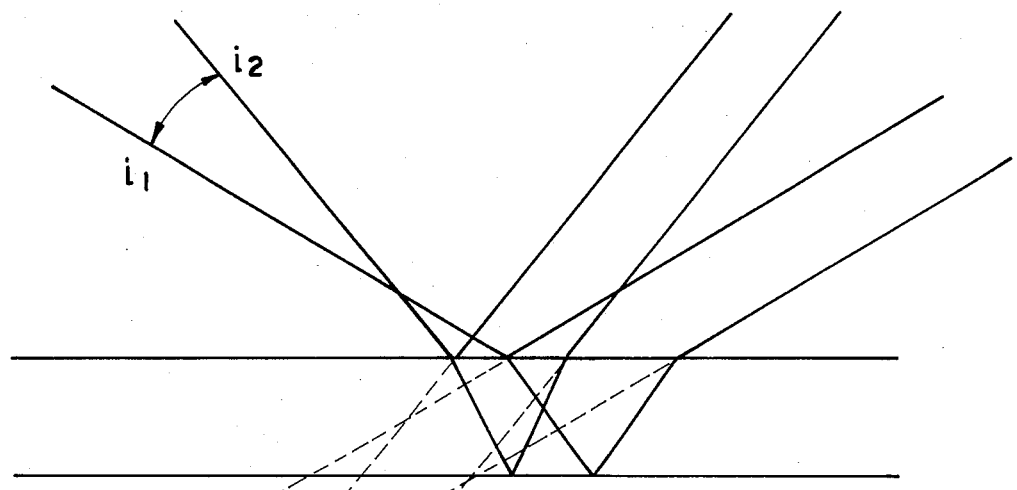
FIGS. 6a and 6b illustrate the affect of misfocus upon the interference regions caused by the apparatus shown in FIG. 4.
Figure 6B:
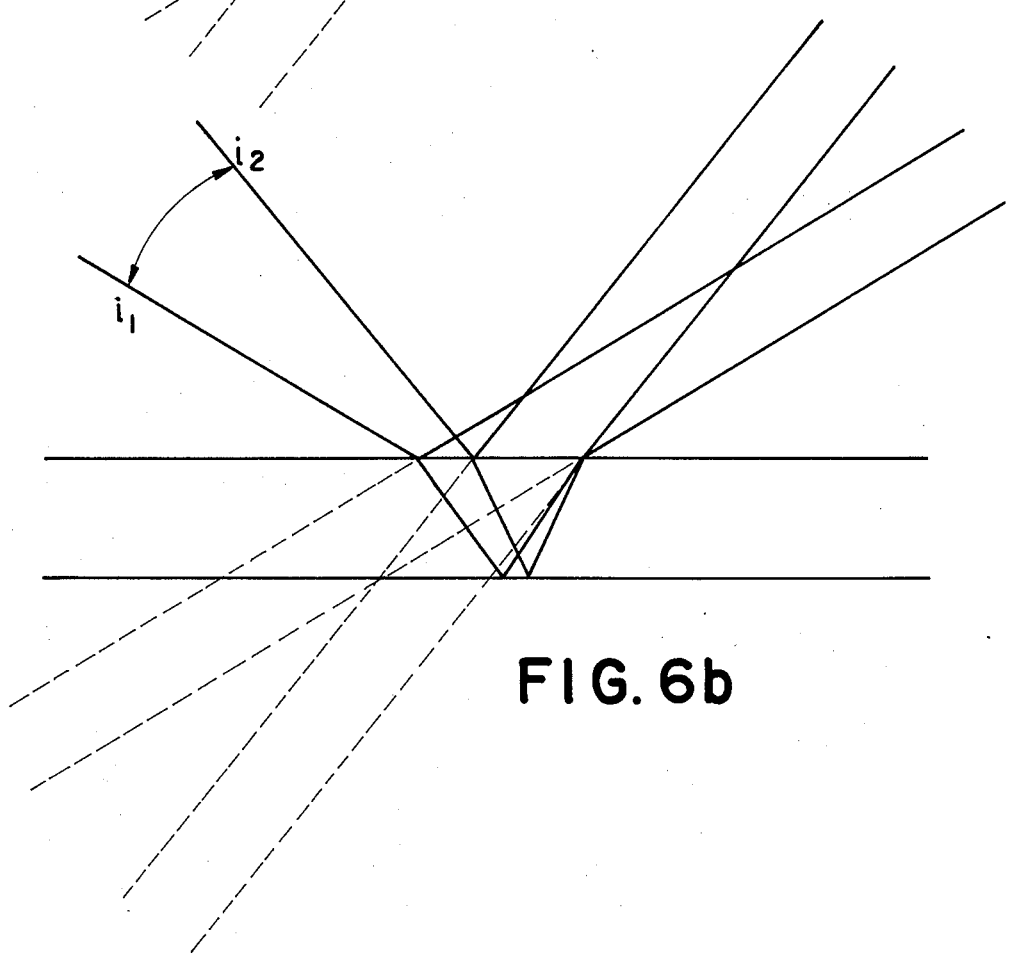

As is apparent from the above, this shift relationship is linear for two given angular limits. Referring now to FIGS. 5a and 5b, there is shown a plot of this function in terms of the angle of incidence for five thickness values around 7 mils, and index of refraction of 1.5, and a wavelength of 633 nanometers. As can be seen from FIG. 5a, seven mils thickness corresponds to a fringe order of approximately 842 with normal incidence and 628 with grazing, or near horizontal incidence, giving a total order shift $\Delta m$ of approximately 214 fringes. It is also apparent from FIG. 5a, when viewed in conjunction with FIG. 5b, that the relationship of the fringe shift $\Delta m$ versus the angle of incidence is approximately linear over the range between 45 and 54 degrees.

Figure 4:
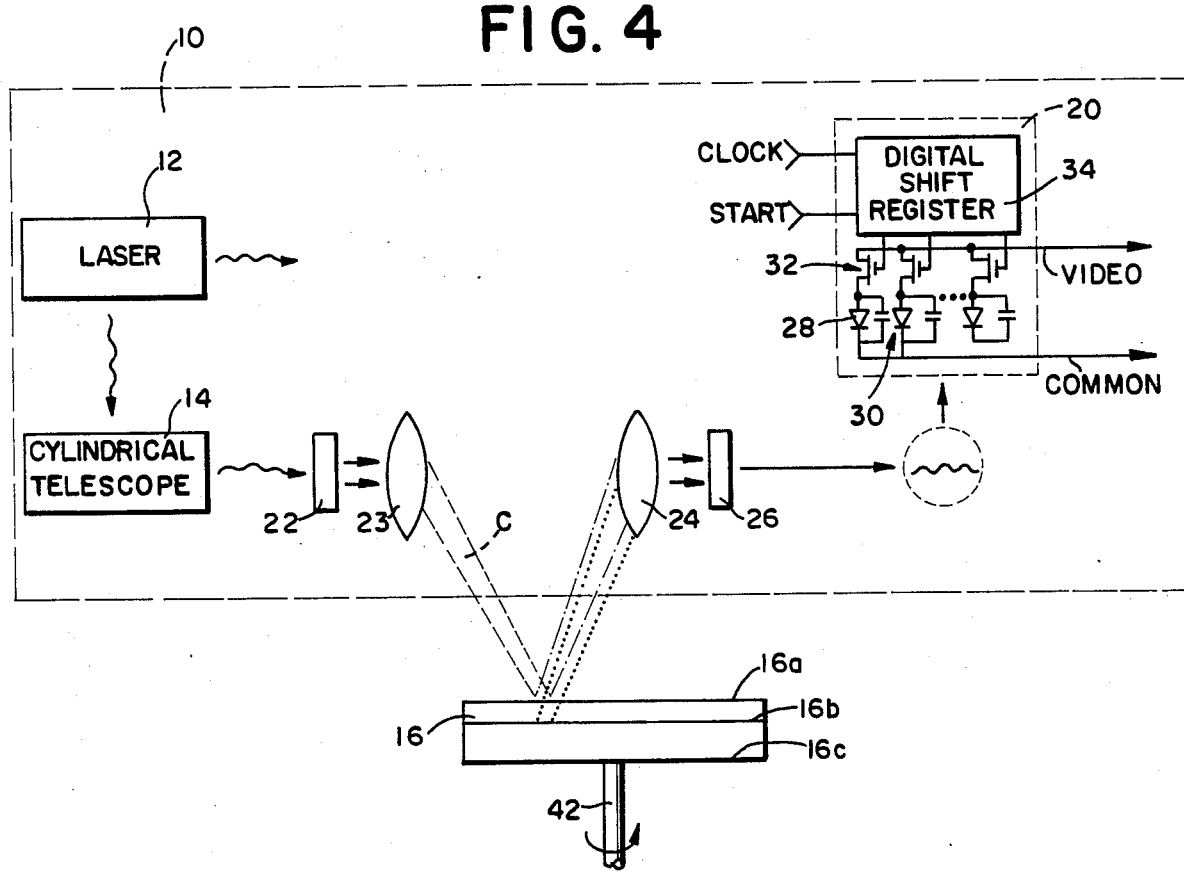
FIG. 4 is a block diagram of a scanning angular fringe spectrometer according to the present invention.

Referring now to FIG. 4, there is shown therein a scanning angular fringe spectrometer 10 according to the present invention and employing the above described angular fringe approach. A beam of light shown diagrammatically emitting from a helium-neon laser 12 is reconfigured by a cylindrical telescope 14 to produce a collimated, elongated beam in order to concentrate as much of the light reflected from a dust defocus layer or overcoat 16 situated upon an optical disk 18 as is possible on a solid state image sensing means 20. The significance of such a case becomes very important if either the upper surface 16a or lower surface 16b of the overcoat 16 are not very reflective.

A focus lens 22 receives the collimated beam and imparts a converging angular focus which forms a converging beam similar to that shown in FIG. 3. The converging beam C is directed upon the overcoat 16 at a selected angle of incidence i. Referring again to FIG. 3, the converging beam C is defined by an angular spread S which is centered about the angle of incidence i. Thereafter, the upper and lower surfaces 16a and 16b of the overcoat 16 cause a pair of angled, divergent beams to be reflected from the upper and lower surfaces 16a and 16b, forming an angular fringe pattern which is received by a collecting mirror 24 and recollimated by a collimating lens 26 to direct the angular fringe pattern to be incident on the sensing means 20 at a convenient distance.

In accordance with one important aspect of the invention, the sensing means 20 is suitably comprised of a self-scanning photodiode array including a plurality of photodiodes 28 arranged in a spaced relationship along a line, each of the photodiodes 28 including an associated capacitance 30 and a multiplex switch 32. The sensing means 20 further includes a digital shift register 34 driven at a clock rate selected to sample the photodiodes 28 at a predetermined rate wherein the shift register 34 sequentially activates the multiplex switches 32 and empties to a common output line a charge from each of the diode capacitances 30 in accordance with the light which is incident on its respective photodiode 28 as cause by the angular fringe pattern. In operation, as is conventional, a simple current amplifier 36 holds the video line at virtual ground and senses the current pulses flowing into the video line to recharge the photodiodes 28 through their respective multiplex switches 32 as they are sampled in sequence. These current pulses can thus be converted by the amplifier 36 to a train of voltage pulses corresponding to the light intensity on the various photodiodes 28. When light is incident on the photodiodes 28, charge develops on the individual capacitances 32. This charge accumulates with exposure until the locked shift register 34 sequentially turns on the multiplex switch 32 for a given photodiode 28. The charge is then released to the common output line, forming an output signal which is a discrete time analog of the spatial intensity profile illuminating the row of photodiodes 28. In general, such self-scanning photodiode arrays or line scanners 20 have their photodiodes 28 on one mil centers, and are uniformly sensitive to within about 7 percent. One suitable such self-scanning photodiode array 20 is manufactured by EG & G Reticon of Sunnyvale, Calif. as model RL256G.

Figure 7:
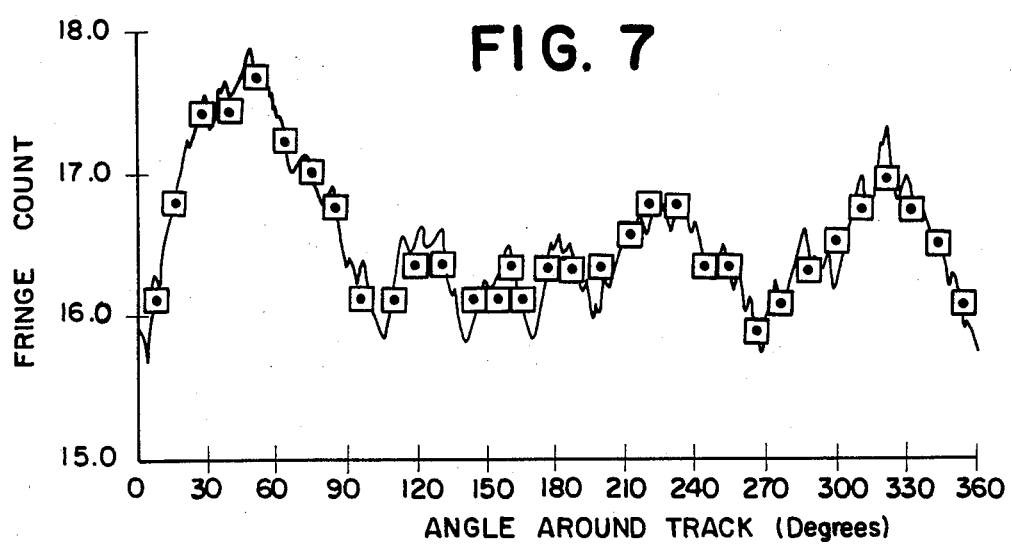
FIG. 7 shows a plot of the comparison between the absolute thickness of a dust defocus layer upon an optical disk spinning at 20 RPM, and the thickness determined by a contact eddy-current probe.

In order to monitor the absolute thickness of the dust defocus layer upon a spinning optical disk, the aforedescribed scanning angular fringe spectrometer 10 may be suitably mounted upon an optics plate 38 which is mounted to a stepper motor driven, linear stage 40 for selectively positioning the spectrometer 10 in relationship to the optical disk 18 which is clamped to a stepper motor-driven spindle 42, allowing any point on the disk 18 to be accessed. Once the optics plate 38 is appropriately positioned, the converging beam formed by the laser 12 in conjunction with the cylindrical telescope 14, focus lens 22 and projecting mirror 23 is directed toward the overcoat 16 upon the spinning disk 18 at a predetermined angle of incidence having an angular spread S of preferably 10 degrees, and preferably between the angles of incidence of 45 degrees and 54 degrees. The reflected beams from the two coating surfaces 16a and 16b subsequently interfere forming a fringe pattern which is collected by the collecting mirror 24 and recollimated by the collimating lens 26 to be incident on the self-scanning photodiode array 20 where the fringes are scanned. Assuming the fringes are uniformly spaced within the predetermined angular spread S, a determination of the absolute thickness of the overcoat 16 may be made by counting the clock pulses and zero crossings from the first to last zero crossing. The zero crossing count is then multiplied by the number of sensing elements in the photodiode array 20 and divided by the clock count to yield a fringe count plus any residual leftover at the beginning and end. Because of the high speed at which the array 20 may be scanned, and also because the thickness of the coating 16 does not often vary rapidly on a local basis, accurate measurements can be made on selected disks 18 spinning at rates up to 400 RPM. Some high slope coatings necessitate lower evaluation rates (i.e., 50 RPM), but in any case a rate of 10 RPM is considered to be safe for overcoats 16 having unknown thicknesses. FIG. 7 illustrates the correlation between thicknesses determined by the method and apparatus according to the present invention on the 6.5 inch radius of an optical disk spinning at 20 RPM as compared to the statistically measured thicknesses determined by a conventional contact eddy-current probe.

As is apparent from the above, the advantages of the aforedescribed method and apparatus for measuring the absolute thickness of a dust defocus layer upon a spinning optical disk include the provision of simple optics, high speed, and high accuracy in the range of + or −0.5 microns. Obviously, many modifications and variations of the present invention are possible in light of the above teachings. For example, the thickness data obtained hereby can be low-pass filtered and differentiated once or twice to obtain velocity and acceleration profiles. It is therefore to be understood that within the scope of the appended claims, the invention may be practiced otherwise than as specifically described.

What is claimed is:

1. Apparatus for measuring the distance between upper and lower surfaces of a transparent coating upon a planar surface, comprising:
 means for producing a beam of light;
 means, optically coupled to said light-producing means, for collimating said beam, wherein said collimating means is a cylindrical telescope;
 lens means coupled to receive said collimated beam for focusing said collimated beam, at a point proximate to the coating, thereby forming a converging beam which is directed towards the coating at a predetermined angle of incidence defined by an angular spread centered about said angle of incidence, wherein said converging beam is reflected from the upper and lower surfaces, thereby forming a pair of diverging beams with an interference pattern having a fringe density which is proportional to the distance between the upper and lower surfaces; and
 solid-state image sensing means coupled to receive said interference pattern for counting the number of fringes between said angular spread.

2. A method for determining the distance between upper and lower surfaces of a transparent coating upon a planar surface, comprising the steps of:
 producing a beam of light;
 collimating said beam;
 focusing said collimated beam to produce a converging beam having a predetermined angular spread;
 reflecting said converging beam from the upper and lower surfaces to produce a pair of diverging beams having an interference pattern formed therebetween, wherein said interference pattern consists of a plurality of alternating nulls and peaks forming a plurality of fringe cycles;
 counting the number of fringe cycles within said predetermined angular spread, wherein said counting step consists of the steps of:
 setting a threshold value indicative of a midpoint between each respective null-peak pair;
 pulsing said sensing means at a predetermined clock rate corresponding to a preselected number of sensing elements within said sensing means;
 counting said clock pulses and a number indicative of the total times said threshold value is exceeded;
 multiplying said number, minus one, by the number of said sensing elements; and
 dividing the result from said multiplying step by said count of clock pulses encompassing the (n-1) fringes to yield a fringe count that is proportional to the distance between the upper and lower surfaces of the transparent coating.

3. Apparatus for measuring the absolute thickness of a dust defocus layer upon a spinning optical disk, comprising;
 a source of light;
 means, coupled to said source, for collimating a beam of light received therefrom, wherein said collimating means is a cylindrical telescope;
 lens means coupled to receive said collimated beam for focusing said collimated beam to produce a converging beam which is directed towards the layer at a predetermined angle of incidence defined by an angular spread centered about said angle of incidence;
 collection means for receiving a first and second diverging beam reflected respectively from an upper and lower surface of the layer, wherein said first and second diverging beams form an interference pattern having a fringe density which is proportional to the absolute thickness; and
 a self-scanning linear diode array receiving said interference pattern, said array adapted to count the fringes therein and determine said fringe density.

4. A method for measuring the absolute thickness of a dust defocus layer with upper and lower surfaces situated upon a spinning optical disk, comprising the steps of:
 producing a beam of light;
 collimating said beam;
 shaped said collimated beam to produce a converging beam having a predetermined angular spread;
 reflecting said converging beam from the upper and lower surfaces to produce a pair of diverging beams having an interference pattern formed therebetween, said interference pattern having a plurality of fringes with a fringe density that is proportional to the absolute thickness;

receiving said pair of diverging beams with said interference pattern formed therebetween with collection means;

disposing a self-scanning linear diode array relative to said collection means so as to project said interference pattern upon said self-scanning linear diode array; and counting said plurality of fringes in said interference pattern with said self-scanning linear diode array, thereby determining said fringe density and the absolute thickness.

5. The method according to claim 4, wherein said shaping step comprises focusing said collimated beam substantially at said dust defocus layer.

6. The method according to claim 4, wherein said shaping step comprises focusing said collimated beam at a point above said dust defocus layer.

7. The method according to claim 4, wherein said shaping step comprises focusing said collimated beam at a point beneath said dust defocus layer.

* * * * *

UNITED STATES PATENT AND TRADEMARK OFFICE
CERTIFICATE OF CORRECTION

PATENT NO. :   4,815,856
DATED      :   March 28, 1989
INVENTOR(S):   Bruce

It is certified that error appears in the above-identified patent and that said Letters Patent is hereby corrected as shown below:

Column 1, line 19, before the word "negative" insert --a--.

Column 7, line 4, please change "54" to --55--.

Column 8, line 61, please change the word "shaped" to --shaping--.

Signed and Sealed this

Twenty-sixth Day of December, 1989

*Attest:*

JEFFREY M. SAMUELS

*Attesting Officer*   *Acting Commissioner of Patents and Trademarks*